(12) United States Patent
Tan et al.

(10) Patent No.: US 8,049,824 B2
(45) Date of Patent: Nov. 1, 2011

(54) SINGLE-LAYER BIREFRINGENT CRYSTAL TRIM RETARDERS

(75) Inventors: Kim Leong Tan, Santa Rosa, CA (US); Karen Denise Hendrix, Santa Rosa, CA (US)

(73) Assignee: JDS Uniphase Corporation, Milpitas, CA (US)

( * ) Notice: Subject to any disclaimer, the term of this patent is extended or adjusted under 35 U.S.C. 154(b) by 838 days.

(21) Appl. No.: 12/028,390

(22) Filed: Feb. 8, 2008

(65) Prior Publication Data

US 2008/0192184 A1 Aug. 14, 2008

Related U.S. Application Data

(60) Provisional application No. 60/888,962, filed on Feb. 9, 2007.

(51) Int. Cl.
*G02F 1/13363* (2006.01)
*G02B 5/30* (2006.01)

(52) U.S. Cl. ............ 349/9; 349/118; 349/119; 349/137; 359/489.07

(58) Field of Classification Search ................. 349/5, 96, 349/117–120, 137, 177, 8, 9; 359/497, 500, 359/489.07, 489.12, 489.15, 489.16; 353/31, 353/34, 122
See application file for complete search history.

(56) References Cited

U.S. PATENT DOCUMENTS

| | | | |
|---|---|---|---|
| 3,924,930 A | 12/1975 | Dewhirst et al. | 350/157 |
| 5,196,953 A | 3/1993 | Yeh et al. | 349/119 |
| 6,816,309 B2 | 11/2004 | Chen et al. | 359/498 |
| 6,829,026 B2 | 12/2004 | Sasaki et al. | 349/118 |
| 7,126,649 B2 | 10/2006 | Chen et al. | 349/5 |
| 7,170,574 B2 | 1/2007 | Tan et al. | 349/117 |
| 2004/0085487 A1 | 5/2004 | Chen et al. | 349/5 |
| 2005/0128391 A1 | 6/2005 | Tan et al. | 349/117 |
| 2006/0092349 A1 | 5/2006 | Moriya et al. | 349/98 |
| 2006/0268207 A1 | 11/2006 | Tan et al. | 349/117 |
| 2007/0070276 A1 | 3/2007 | Tan et al. | 349/117 |
| 2007/0258029 A1 | 11/2007 | Nakagawa et al. | 349/119 |
| 2007/0285601 A1 | 12/2007 | Hendrix et al. | 349/117 |

FOREIGN PATENT DOCUMENTS

| | | |
|---|---|---|
| EP | 1542044 | 6/2005 |
| WO | 03/089981 | 10/2003 |

OTHER PUBLICATIONS

K. Tan et al., "Design and characterization of a compensator for high contrast LCoS projection systems," SID 2005, p. 1810, 2005.
D. Anderson and K. Shahzad, "Off-axis LCoS compensation for enhanced contrast", SID 03 Digest, pp. 1433-1435, 2003.

(Continued)

*Primary Examiner* — Dung Nguyen
*Assistant Examiner* — Tai Duong
(74) *Attorney, Agent, or Firm* — Matthew A. Pequignot; Pequignot + Myers LLC

(57) ABSTRACT

A single-layer birefringent crystal trim retarder includes a birefringent crystal cut such that its optic axis is at a high oblique angle and such that it provides low in-plane retardance values even when the birefringent crystal is relatively thick. To compensate for the inherent high +C-plate retardance of this high-tilt O-plate, the single-layer birefringent crystal is coupled with a −C-plate thin-film retarder to provide a trim retarder having an overall A/−C-plate retarder functionality. This full-function trim retarder is practical to fabricate, is thickness and azimuthal angle tolerant, and is suitable for low sensitivity angular clocking requirements of LCoS panel compensation.

17 Claims, 16 Drawing Sheets

OTHER PUBLICATIONS

Lu et al, "An O-plate compensated in-plane switching liquid crystal display", IEEE J. Displ. Technol., vol. 2, No. 3, pp. 223, 2006.

J.P. Eblen Jr. et al., "Bifringent compensators for normally white TN-LCDs", SID'94 Digest, Bip. 245, 1994.

S-T. Wu, "Film compensated homeotropic liquid-crystal cell for direct view display", J. Appl. Phys., 76(10), pp. 5975-5980, 1994.

J. Chen, M.G. Robinson and G.D. Sharp, "General methodology for LCoS panel compensation", SID 04, Digest, pp. 990-993, 2004.

P. Yeh, "Optical waves in layered media," John Wiley & Sons, New York, p. 210, 1988.

H. Hatoh, M. Ishikawa, Y. Hisatake and J. Hirata, T. Yamamoto, SID '92 Digest, p. 401, 1992.

H. Seiberle, K. Schmitt and M. Schadt, "Multidomain LCDs and complex optical retarder generated by photo-alignment," Proceedings Euro Display '99, pp. 121-125, 1999.

H. Mori, Y. Itoh, Y. Nishiura, T. Nakamura and Y. Shinagawa, Jap. J. Appl. Phys., 36, pp. 143-147, 1997.

H. Mori, M. Nagai, H. Nakayama, Y. Itoh, K. Kamada, K. Arakawa, and K. Kawata, "Novel Optical Compensation Method Based upon a Discotic Optical Compensation Film for Wide-Viewing-Angle LCDS," SID 03 Digest, p. 1058-1061, 2003.

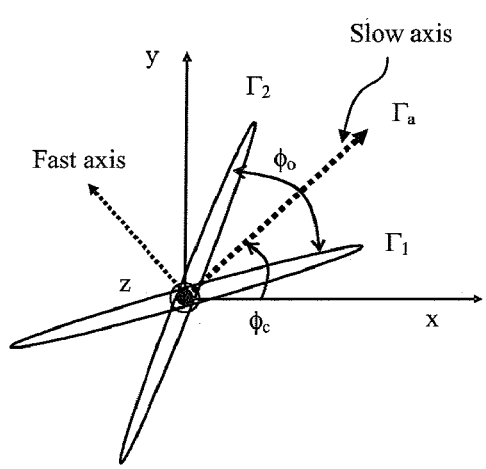 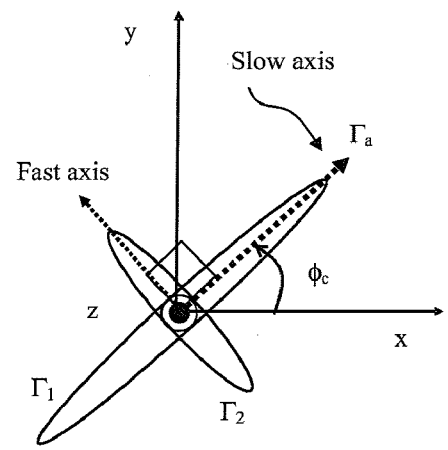
(Prior Art)
Fig. 4a
(Prior Art)
Fig. 4b

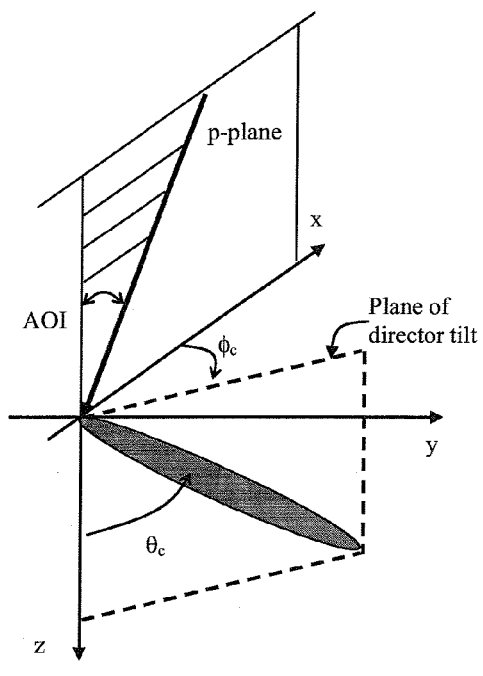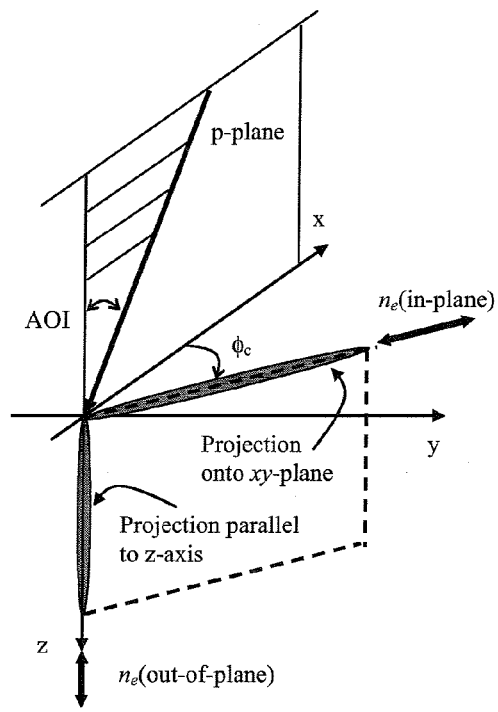
Fig. 9a
Fig. 9b

SINGLE-LAYER BIREFRINGENT CRYSTAL TRIM RETARDERS

CROSS-REFERENCE TO RELATED APPLICATIONS

This application claims priority from U.S. Provisional Application No. 60/888,962 filed Feb. 9, 2007, which is hereby incorporated by reference for all purposes.

MICROFICHE APPENDIX

Not Applicable.

TECHNICAL FIELD

The present application relates generally to optical retarders, and in particular, to trim retarders utilizing a single-layer birefringent crystal and liquid crystal display based microdisplay projection systems including the same.

BACKGROUND OF THE INVENTION

Liquid-crystal displays (LCDs) are widely used in projection displays for large screen televisions and monitors. In these LCD-based projection systems, a high power beam of light is passed through a polarizer before being incident on a LCD panel. The LCD panel controls the polarization of the incident light pixel-by-pixel and directs it towards the corresponding polarizer/analyzer, which then directs light having the proper polarization to a projection lens that projects an image onto a screen.

One particularly successful LCD-based projection system is a WGP-based LCoS microdisplay system, which uses both wire grid polarizers (WGPs) and liquid crystal on silicon (LCoS) panels. This microdisplay system, which has been proven to exhibit both high resolution and high image contrast when compared to other microdisplay technologies such as transmissive liquid crystal (xLCD), digital light processor (DLP), and direct-view LCD, typically uses three or more microdisplay panels (e.g., one for each primary color band) to improve on-screen brightness.

Referring to FIG. 1, a conventional 3-panel WGP-based LCoS microdisplay system is shown. The microdisplay system includes a light source 5, which for example is a high-pressure discharge lamp, and a light rod 7. The light rod 7 homogenizes the cone of light produced by the light source 5 to ensure a spatially uniform light distribution. Optionally, the light rod 7 is a polarization conversion light pipe (PCLP) for producing linearly polarized light. A first lens 8a passes the light from the light pipe 7 to a first folding mirror 9, which directs the light to a first dichroic filter 10. The dichroic filter 10 separates out the blue light from the remaining light, and directs the blue light via second 8b and third 8c lenses, and second 17 and third 16 folding mirrors to a first LCoS display panel 20a. The remaining light, which is transmitted through the dichroic filter 10, is directed via fourth and fifth lenses 8d and 8e and a fourth folding mirror 11 to a second dichroic filter 12. The second dichroic filter 12 separates the remaining light into green and red light, the former of which is directed to a second LCoS display panel 20b and the latter of which passes to a third LCoS display panel 20c.

Prior to reaching each LCoS display panel 20a, 20b, and 20c, the incident light first passes through a WGP 15, 14, and 13 and a trim retarder compensator 21a, 21b, and 21c, respectively. Each WGP 15, 14, and 13 is a polarizer/analyser formed from a plurality of parallel micro-wires that transmits light having a polarization orthogonal to the direction of the parallel micro-wires and reflects light having a polarization parallel to the direction of the wires (e.g., if the polarizers are designed to pass horizontal or P-polarized light, as illustrated in FIG. 1, the micro-wires will be perpendicular to the plane of FIG. 1). Each LCoS panel 20a, 20b, and 20c alters the polarization of the linearly polarized incident light pixel-by-pixel and reflects the modulated light back to the corresponding WGP 15, 14, and 13. Since each WGP 15, 14, and 13 is orientated at approximately ±45° with respect to the principal direction of light propagation, in addition to serving as a polarizer/analyzer, each WGP 15, 13 and 14 also serves as a beamsplitter for separating the incoming light from the outgoing light by steering or deflecting the light reflected from the each LCoS panel along an output optical path orthogonal to the incoming optical path. More specifically, each WGP 15, 14, and 13 reflects S-polarized light (e.g., polarized light rotated by 90° by pixels in an ON state) to the X-cube 19. The X-cube 19 aggregates (i.e., converges) the image from each of the three color channels and, via the projection lens 18, projects the final image onto a large screen (not shown). Optionally, each color channel further includes a pre-polarizer (not shown) and/or a clean-up analyzer (not shown), which for example, may include one or more WGPs and/or dichroic sheet polarizers.

The trim retarder compensators 21a, 21b, and 21c (herein simply referred to as trim retarders), are compensating elements used to improve the contrast performance level of the microdisplay system, which is otherwise limited by the residual birefringence of the LCoS panels in the dark (e.g., off) state. In particular, each trim retarder 21a, 21b, and 21c introduces a phase retardance that cancels the retardance resulting from the inherent birefringence of the corresponding LCoS panel. The term 'retardance' or 'retardation', as used herein, refers to linear retardance magnitude as opposed to circular retardance magnitude, unless stated otherwise. Linear retardance is the difference between two orthogonal indices of refraction times the thickness of the optical element. Linear retardance causes a phase difference between two orthogonal linear polarizations, where one polarization is aligned parallel to the extra-ordinary axis of the linear retarder and the other polarization is aligned parallel to the ordinary axis of the linear retarder. In contrast, circular retardance causes a relative phase difference between right- and left-handed circular polarized light.

Linear retardance may be described as either in-plane or out-of-plane retardance. In-plane retardance, expressed as optical path length difference, refers to the difference between two orthogonal in-plane indices of refraction times the physical thickness of the optical element. Out-of-plane retardance refers to the difference of the index of refraction along the thickness direction (z direction) of the optical element and one in-plane index of refraction (or an average of in-plane indices of refraction), times the physical thickness of the optical element. Normal incidence rays in a cone bundle see only in-plane retardance, whereas off-axis rays including oblique rays (i.e. non-normal but along the principal S- and P-planes) and skew rays (i.e. non-normal and incident away from the principal S- and P-planes) experience both out-of-plane retardance and in-plane retardance. Notably, in-plane retardance is not observed for the trivial case of 90° ray angle in the birefringent medium.

In the absence of trim retarders 21a-c, the P-polarized polarized light that illuminates each microdisplay panel in the dark (off) state is slightly elliptically polarized upon reflection due to the residual birefringence of the LCoS panels 20a-c. When the elliptically polarized light, which contains both a P- and an S-component, is transmitted to the corresponding WGP 15, 14, 13, the S component is reflected to the X-cube thus allowing dark state light leakage onto the large screen and limiting the contrast of the projection system.

The trim retarders 21*a*-*c* improve the contrast level by providing in-plane retardance that compensates for the retardance resulting from the residual birefringence in the LCoS panels 20*a*-*c*. Accordingly, each trim retarder 21*a*-*c* typically includes an A-plate component having its slow axis configured at orthogonal azimuthal alignment to the slow axis of the corresponding LCoS panel 20*a*-*c* (termed "crossed axes"), while its fast axes is configured at orthogonal azimuthal alignment to the fast axis of the corresponding LCoS panel 20*a*-*c*. The terms slow axis (SA) and fast axis (FA), as used herein, refer to the two orthogonal birefringent axes when the linear retardance is measured at normal incidence. Notably, the SA and FA locations change with off-axis illumination as well as reversing the SA/FA roles for a negative out-of-plane retardance component at a large angle of incidence.

Since the slow axes of the trim retarders 21*a*-*c* and LCoS panels 20*a*-*c* are configured at orthogonal azimuthal orientations, the role of the fast/slow axes switches from the trim retarder 21*a*-*c* to the LCoS panel 20*a*-*c* for normal incidence light. In other words, light having a specific polarization is alternately delayed more then less, or vice-versa, in the trim retarder 21*a*-*c* and the LCoS panel 20*a*-*c*, respectively. The net effect is zero relative delay for the incoming polarization, and as a result, an unchanged polarization (i.e., the output light is not elliptically polarized). The corresponding WGP 15, 14, 13 and/or optional clean-up polarizer then rejects the output light so that the dark-state panel light leakage does not appear on the screen. Since the trim retarders 21*a*-*c* do not alter significantly the throughput of the panel on-state, the resulting sequential contrast (full on/full off) is excellent.

The operating principle of each trim retarder 21*a*-*c* is further illustrated in FIG. 2, with reference to the core optics of a single-channel light engine. These core optics include a pre-polarizer 30, a WGP 31, a trim retarder 32, a vertical aligned nematic (VAN)-mode LCoS panel 33, and a clean-up polarizer (not shown). In operation, unpolarized or partial polarized light output from a prior stage illumination (not shown) is passed through the pre-polarizer 30 to obtain P-polarized light. The light is transmitted through the WGP 31 and its polarization extinction ratio is enhanced. The trim retarder 32 preconditions the incoming P-polarization beam and creates an elliptical output. Ideally, the ellipticity in the polarized light incident onto the LCoS panel 33, which is in a dark (off) state, is undone by the residual panel retardance. The reflected light, after completing a double pass through the VAN-LCoS panel 33 and the trim retarder 32, thus remains P-polarized. The remaining P-polarization component transmitted by the WGP 31 is injected back into the illumination system and is eventually lost.

As discussed above, the trim retarder 32 ideally provides an in-plane retardance that matches the in-plane retardance of the corresponding LCoS panel 33 in the dark state. In practice, however, the in-plane retardance (i.e., A-plate retardance) of both the LCoS panel 33 and the trim retarder 32 tends to vary within each component due to manufacturing tolerances in device thickness and material birefringence control, as well as operational drifts (temperature, mechanical stress etc). As a result, to ensure adequate compensation it is common to provide a higher A-plate retardance in the trim retarder 32 than that exhibited by the LCoS panel 33. For example, a trim retarder with an A-plate retardance of 10 nm (at λ=550 nm) is often provided to compensate for a VAN-mode LCoS exhibiting a 2 nm A-plate retardance (at λ=550 nm) in the dark state.

As is known to those skilled in the art, this mismatch in A-plate value requires offsetting of the optic axis of the trim retarder 32, relative to the nominal crossed axes configuration described above. In other words, the trim retarder is 'clocked-in' by rotating its azimuth orientation away from the crossed-axes configuration. For example, see J. Chen, M. G. Robinson and G. D. Sharp, "General methodology for LCoS panel compensation", SID 04, Digest, pp. 990-993, 2004. FIG. 3, which shows the relative azimuthal orientations of the LCoS panel and the trim retarder slow axes, illustrates how the higher value trim retarder is "clocked" away from the bisector of S- and P-polarization planes, in the adjacent quadrant, by an angle φ. When the slow and fast axes of the VAN-LCoS panel bisect the S- and P-polarization planes, as discussed above, when the LCoS retardance is very small (e.g., <<λ/50), and for a trim retarder A-plate retardance up to a quarterwave, the over-clocked angle, φ, is approximately given by:

$$\phi \approx \frac{\cos^{-1}([\Gamma_a(LC)/\Gamma_a(TR)])}{2}$$

where $\Gamma_a(TR)$ is the trim retarder A-plate retardance and $\Gamma_a(LC)$ is the LCoS A-plate retardance. Accordingly, the over-clocked angle is about 39° when the LCoS exhibits a 2 mm in-plane retardance and the trim retarder provides about 10 nm of in-plane retardance.

In addition to providing in-plane retardance, the trim retarder 32 is also often required to provide out-of-plane retardance to increase the field of view of the LCoS panel. Out-of-plane retardance compensation is often provided with a C-plate component. While a C-plate does not provide any net retardation for normal-incident rays (i.e., normal incident light is unaffected by the birefringence), rays incident off-axis (i.e., at an angle to the extraordinary axis) experience a net retardation that is proportional to the incident angle. A C-plate is considered to be positive if the retardance increases with angle of incidence and negative if the retardance decreases with angle of incidence. Alternatively, a C-plate is considered to be positive if the retardance the birefringence product Δnd is negative (e.g., if $n_e - n_o$ is negative). Since VAN-mode LCoS panels typically function as +C-plates, it is common for trim retarders to include both an A-plate component for compensating the in-plane retardance (i.e., A-plate retardance) and a −C-plate component for compensating for negative out-of plane retardance (i.e., −C-plate retardance). The resulting trim retarders are conveniently termed A/−C-plate trim retarders.

Optionally, these full function A/−C-plate trim retarders include an O-plate. As is well known to those skilled in the art, an O-plate has both in-plane and out-of-plane retardance. O-plates have been stated to provide improved compensation in various LCD projections systems (e.g., see US Pat. Appl. No. 20040085487 and Lu et al, "An O-plate compensated in-plane switching liquid crystal display", IEEE J. Displ. Technol., Vol. 2, No. 3, pp. 223, 2006). For clarity, an A-plate is an optical retardation element having its extraordinary axis oriented parallel to the plane of the plate, a C-plate is an optical retardation element having its extraordinary axis oriented perpendicular to the plane of the plate (i.e. parallel to the direction of normally incident light), and an O-plate is an optical element having its extraordinary axis (i.e., its optic axis or C-axis) oriented at an oblique angle with respect to the plane of the plate.

Trim retarders may be fabricated from any material or combination of materials used to form conventional optical retarders (e.g., configured as A-plates, C-plates, and/or O-plates). For example, some possible materials include stretched polymer films such as polyvinylalcohol (PVA) or polycarbonate (PC) films, discotic films, aligned films of liquid crystal polymer (LCP) material, organic foils such as cellulose acetate, birefringent crystals, and dielectric thin films. In general, the selected material(s) should: a) provide a uniform, accurate, and reproducible A-plate retardance, b) provide an accurate and reproducible C-plate retardance profile, and c) be durable under high light flux and high temperature conditions. In addition, these properties should be achievable even when the trim retarder has a relatively low retardance value. For example, trim retarders used to compensate VAN-mode LCoS microdisplay panels are typically required to have an A-plate retardance of less than about 30 nm and a −C-plate retardance of about −100 to −380 nm, at 550 nm wavelength.

Of the above-described optical retarder materials, birefringent crystals are known to be one of the most durable in high light flux and high temperature environments. In addition, a birefringent plate may be cut from a raw birefringent crystal such that its optic axis is parallel to the plane of the plate (i.e., an A-plate), perpendicular to the plane of the plate (i.e., a C-plate), or at an oblique angle with respect to the plane of the plate (i.e., an O-plate). The resulting birefringent plate may then be polished to a predetermined thickness to provide a predetermined retardance (e.g., zero-order quarter-wave A-plate retardance). In addition, in the area of birefringent crystal waveplates, pseudo-zero order retarders are routinely fabricated by crossing optic axes of two birefringent crystal plates. The individual layers may have a positive (e.g., single-crystal quartz or single-crystal magnesium fluoride) or a negative (e.g. calcite crystal) birefringence. This cross-axis arrangement has also been used for fabricating achromatic waveplates utilizing two waveplate elements with appropriate dispersion profiles (such as single-crystal quartz and magnesium fluoride combination).

Despite the fact that birefringent crystals are known for their high durability in high light flux and high temperature environments, their use as trim retarders in low-retardance applications, such as the above-described microdisplay systems (MDPS), has been generally considered less than ideal. In general, this is related to the fact that most birefringent crystals configured either as A-plates or low-tilt O-plates have a relatively high birefringence, and thus need to be extremely thin in order to provide the low retardance values associated with VAN-mode LCoS microdisplay panels (e.g., as a true zero-order retarder). Even with its low birefringence (i.e., $\Delta n \sim 0.009$ at $\lambda = 550$ nm), the physical thickness of a quartz A-plate would need to be about 1.1 µm to produce a nominal 10 nm trim retarder. With a high birefringence A-plate, such as yttrium vandate (YVO$_4$) ($\Delta n \sim 0.23$ at $\lambda = 550$ nm), the physical thickness would only be about 43 nm for a nominal 10 nm trim retarder. Clearly, it is not practical to work with plates this thin. In addition, these extremely small thicknesses make it difficult to provide a uniform, accurate, and reproducible A-plate retardance. In particular, it is difficult to meet the desired uniformity specifications (e.g., a couple of percentages), and challenging to target the absolute retardance value, with conventional polishing methods.

One approach of using birefringent crystals as trim retarders in the above-described MDPS is to use multiple-wave retardation. For example, a ten-wave plus 10 nm of retardance provides the same retardation effect as a true zero-order 10 nm retarder at the given center wavelength. For a quartz birefringent plate, the ten-wave plus 10 nm retarder (at $\lambda = 550$ nm) would be approximately 610 µm thick. While this nominal thickness is much more reasonable to work with, it is still challenging to provide a uniform, accurate, and reproducible A-plate retardance. The precision in the required thickness, to hold for example ±5% net retardance tolerance, is ±0.0064%. This thickness tolerance is no different to targeting a 7 nm ±5% tolerance, requiring a ±30 nm physical thickness tolerance, in this example. In addition, the multi-order retarder may be too dispersive over a wide band contrast compensation.

Yet another approach of using birefringent crystals as a trim retarder in the above-described MDPS is to cascade two crystal plate elements with a predetermined azimuthal offset angle.

Referring to FIG. 4a there is shown an example of a non-orthogonal-angle cascade of two substantially equal-magnitude A-plate retarder elements. The magnitude of the first and second A-plate retarders is given by $\Gamma_1$ and $\Gamma_2$, respectively (where $\Gamma_1 \approx \Gamma_2$), whereas the azimuthal offset angle is given by $\phi_o$. The resulting dual-layer retarder functions as an in-plane retarder having its slow-axis aligned at $\phi_c$ azimuthal angle, and having an in-plane retardance $\Gamma_a$ given approximately by $(\Gamma_1 + \Gamma_2)\cos(\phi_o)$. When the two A-plate retarder elements are quartz quarter-wave plates aligned at $\phi_o \approx 88.2°$ and polished such that $\Gamma_1 \approx \Gamma_2$, $\approx 140.5$ nm @ $\lambda = 550$ nm, the net in-plane retardance of the dual-layer retarder is about 7 nm.

Referring to FIG. 4b there is shown an example of a cascade of two A-plate elements having crossed retarder axes. The magnitude of the first and second A-plate retarders is given by $\Gamma_1$ and $\Gamma_2$, respectively, while the azimuthal offset angle $\phi_o$ is equal to 90°. The crossed-axes retarder functions as an in-plane retarder having its slow-axis aligned at $\phi_c$ azimuthal angle, and having an in-plane retardance $\Gamma_a$ given approximately by $(\Gamma_1 - \Gamma_2)$. In other words, the net in-plane retardance is realized from the magnitude mismatches between the first and second A-plates. When the first A-plate retarder is a quartz A-plate of 207 nm retardance, and the second A-plate retarder is another quartz A-plate of 200 nm retardance, oriented at crossed-axes, the net in-plane retardance is about 7 nm.

In each case, the cascade of two A-plate elements also provides a pseudo −C-plate retardance. FIGS. 5 and 6 illustrate the modeled off-axis retardance of the dual-layer retarder and cross-axes retarder, respectively. More specifically, FIGS. 5 and 6 illustrate plots of linear retardance versus angle of incidence (AOI) in air. The equivalent A/C-plate retarder model (e.g., see K. Tan et al., "Design and characterization of a compensator for high contrast LCoS projection systems," SID 2005, p. 1810, 2005) is realized with an $\{n_e, n_o\}$ index pair of $\{1.65, 1.50\}$ for A-plate and $\{1.50, 1.65\}$ for C-plate at $\lambda = 550$ nm. The quartz $\{n_e, n_o\}$ indices are $\{1.5552, 1.5459\}$ at $\lambda = 550$ nm. Referring to FIGS. 5 and 6, the pseudo −C-plate retardance is approximately −84 nm @ $\lambda = 550$ nm and −200 nm @ $\lambda = 550$ nm, for the dual-layer retarder and the cross-axes retarder, respectively. With regard to the latter, the pseudo −C-plate element is the common retardance of the two sub-elements (e.g., −200 nm).

The main issue with using either the dual-layer or the crossed-axes retarders for trim retarder applications is that the crystal plate thickness and azimuthal offset angle tolerances are extremely tight. For example, a quartz crystal plate having a birefringence of ~0.009 requires a thickness tolerance within ±100 nm in order to maintain a ±1 nm of net retardance of each sub-element, whereas the azimuthal offset of the two sub-element should be much less than 0.1° in order to yield a net in-plane retardance with a tight distribution. In addition, the non-90° angle offset of the two sub-elements gives rise to circular retardance at normal incidence.

The modelled linear and circular retardance of the dual-layer retarder are shown in FIG. 7, for a two-layer quartz/quartz retarder having slow-axis aligned at 0.2/88.4° and individual in-plane retardance values of 140.5/140.5 nm. The calculation includes an optical activity (isotropic gyration). Optical activity is a material property that enables the material to rotate plane polarized light. There exists both left- and/or right-hand rotation optical isomers. For a single-crystal quartz plate, the rotation per unit length is approximately 25.4°/mm at 550 nm wavelength (see e.g., see P. Yeh, "Optical waves in layered media," John Wiley & Sons, New York, p. 210, 1988). The dextro-rotary quartz/quartz dual-layer included positive angle rotation (right-handed with respect to viewing the tail-end of the beam), whereas the levo-rotary quartz/quartz dual-layer had the same layer thicknesses, but included negative angle rotation (left-handed). The levo-rotary quartz/quartz dual-layer was oriented at −0.3/86.9° for the first (closer to light incidence) and second quartz layer, respectively.

As illustrated in FIG. 7, the Δnd product of the linear retardance drops off towards the blue wavelength end, while the corresponding circular retardance increases. For some imager panels, such as VAN-mode LCoS, the on-axis birefringence is substantially linear. The presence of circular retardance results in poor image contrast towards the blue wavelength edge. Comparing the dextro- and levo-rotary quartz/quartz dual-layer retarder, with the first layer substantially parallel to the X-axis and the second layer substantially parallel to the Y-axis, the dextro-rotary device is preferred for having a flatter linear retardance spectrum and reduced circular retardance.

The modelled linear and circular retardance for two quartz A-plates at cross-axes are shown in FIG. 8. Depending on the sense of optical activity, the effective axis of the linear retarder is changed, as well as the sign of the net circular retardance in the compound quartz/quartz retarder.

It would be advantageous to provide a trim retarder including a birefringent crystal, which obviates the above-described challenges.

It would also be advantageous to provide a trim retarder including a birefringent crystal, which is practical to fabricate, and which exhibits reasonable thickness and azimuthal angle tolerances.

SUMMARY OF THE INVENTION

The instant invention relates to a single-layer birefringent crystal trim retarder. The birefringent crystal is cut such that its optic axis (i.e., extra-ordinary or C-axis) is at a high oblique angle and such that it provides low in-plane retardance values even when the birefringent crystal is relatively thick.

Since birefringent crystals having their optic axis oriented at a high oblique angle with respect to the surface of the plate typically exhibit undesirably high +C-plate retardance, the high tilt O-plate is coupled with a −C-plate retarder to provide a trim retarder having an overall A/−C-plate retarder functionality, which for example, is suitable for VAN-mode LCoS panel contrast compensation. When the −C-plate retarder is a thin-film multi-layer form-birefringent coating, this full-function trim retarder is practical to fabricate, is thickness and azimuthal angle tolerant, and has potentially high manufacturing yields. In particular, the physical thickness range of the high tilt O-plate is compatible with current polishing/grinding methods and provides manageable polishing/grinding tolerances (e.g., tens to hundreds of microns thick and micron level tolerance). In addition, this small magnitude trim retarder is suitable for low sensitivity angular clocking requirements of LCoS panel compensation.

In accordance with one aspect of the instant invention there is provided an optical retarder comprising: a uniaxial birefringent crystal layer having its optic axis at an oblique angle to a surface of the uniaxial birefringent crystal layer, the oblique angle selected such that the uniaxial birefringent crystal layer has an in-plane retardance in a predetermined wavelength range suitable for compensating for residual in-plane retardance of a liquid crystal display panel used in the predetermined wavelength range when a thickness of the uniaxial birefringent crystal layer is greater than 20 μm; and at least one multi-layer stack including at least one periodic stack of alternating layers of contrasting refractive index materials, a thickness and refractive index of each of the alternating layers selected such that the at least one multi-layer stack has a negative out-of-plane retardance in the predetermined wavelength range that is suitable for compensating for positive out-of-plane retardance of the uniaxial birefringent crystal layer and positive out-of-plane retardance of the liquid crystal display panel, in the predetermined wavelength range.

In accordance with another aspect of the instant invention there is provided a liquid crystal display based projection system comprising: a light source; a first polarizer for receiving light from the light source and transmitting a first linearly polarized light having a first linear polarization axis; a liquid crystal display panel for optically modulating the first linearly polarized light; a second polarizer for receiving the optically modulated light and for transmitting a second linearly polarized light having a second linear polarization axis; a projection lens for projecting the second linearly polarized light onto a screen; and a trim retarder disposed between the liquid crystal display panel and at least one of the first and second polarizers, the trim retarder including: a uniaxial birefringent crystal layer having its optic axis at an oblique angle to a surface of the uniaxial birefringent crystal layer, the oblique angle selected such that the uniaxial birefringent crystal layer has an in-plane retardance suitable for compensating for residual in-plane retardance of the liquid crystal display panel when a thickness of the uniaxial birefringent crystal layer is greater than 20 μm; and at least one multi-layer stack including at least one periodic stack of alternating layers of contrasting refractive index materials, a thickness and refractive index of each of the alternating layers selected such that the at least one multi-layer stack has a negative out-of-plane retardance that is suitable for compensating for positive out-of-plane retardance of the uniaxial birefringent crystal layer and positive out-of-plane retardance of the liquid crystal display panel.

In accordance with another aspect of the instant invention there is provided a liquid crystal display based projection system comprising: a light source; a first polarizer for receiving light from the light source and transmitting a first linearly polarized light having a first linear polarization axis; a liquid crystal display panel for optically modulating the first linearly polarized light; a second polarizer for receiving the optically modulated light and for transmitting a second linearly polarized light having a second linear polarization axis; a projection lens for projecting the second linearly polarized light onto a screen; and a trim retarder disposed between the liquid crystal display panel and at least one of the first and second polarizers, the trim retarder including: a uniaxial birefringent crystal layer having an in-plane retardance and a positive out-of-plane retardance, the in-plane retardance suitable for compensating for residual in-plane retardance of the liquid crystal display panel, a ratio of the positive out-of-plane retardance to the in-plane retardance larger than 30 and less than 150; and at least one multi-layer stack including at least one periodic stack of alternating layers of contrasting refractive index materials, a thickness and refractive index of each of the alternating layers selected such that the at least one multi-layer stack has a negative out-of-plane retardance that is suitable for compensating for the positive out-of-plane retardance of the uniaxial birefringent crystal layer and positive out-of-plane retardance of the liquid crystal display panel.

BRIEF DESCRIPTION OF THE DRAWINGS

Further features and advantages of the present invention will become apparent from the following detailed description, taken in combination with the appended drawings, in which:

FIG. 4a is a schematic diagram showing a dual-layer A-plate element with substantially equal-magnitude A-plate sub-elements;

FIG. 4b is a schematic diagram showing a crossed-axes A-plate element wherein the A-plate sub-elements are oriented with substantially orthogonal retarder axes;

FIG. 9a is a schematic diagram of an obliquely-aligned uniaxial layer;

FIG. 9b is a schematic diagram showing the resolution of the obliquely-aligned uniaxial layer into in-plane and out-of-plane retarder elements;

It will be noted that throughout the appended drawings, like features are identified by like reference numerals.

DETAILED DESCRIPTION

Figure 1:
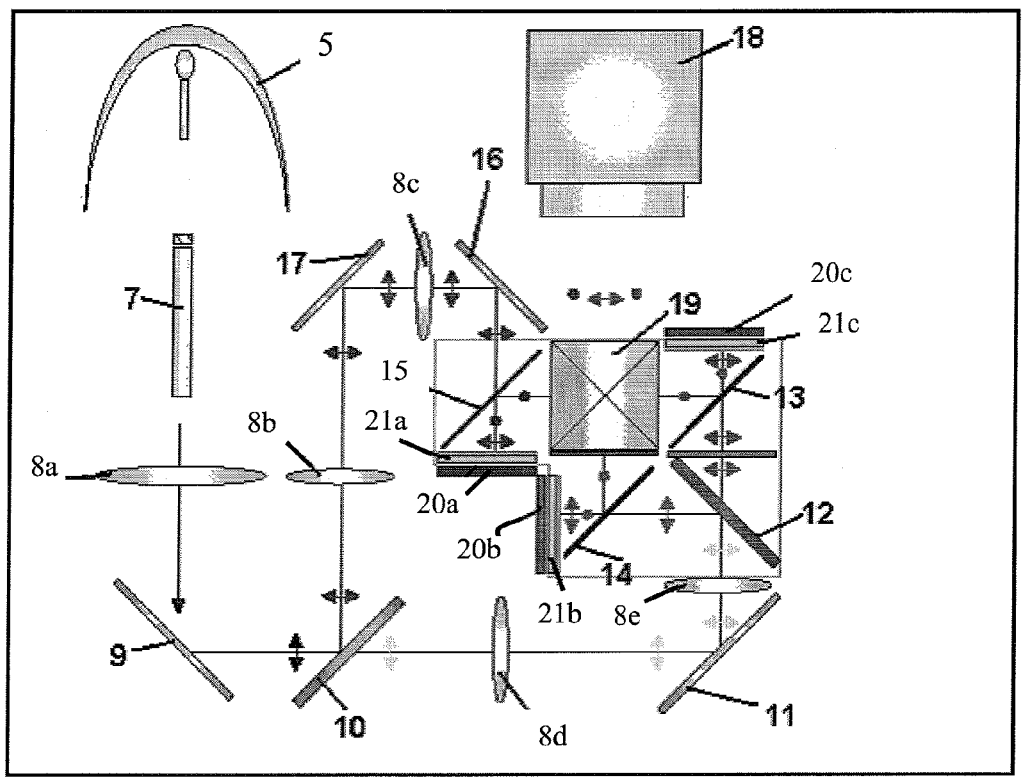
FIG. 1 is a schematic diagram of a prior art 3-panel wire-grid polarizer (WGP) based liquid crystal on silicon (LCoS) projection light engine.
Figure 2:
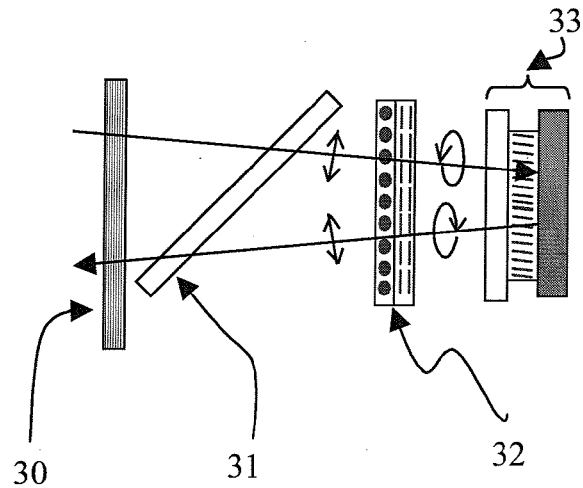
FIG. 2 illustrates the preservation of linear polarization on double passing through a LCoS panel and a trim retarder.
Figure 3:
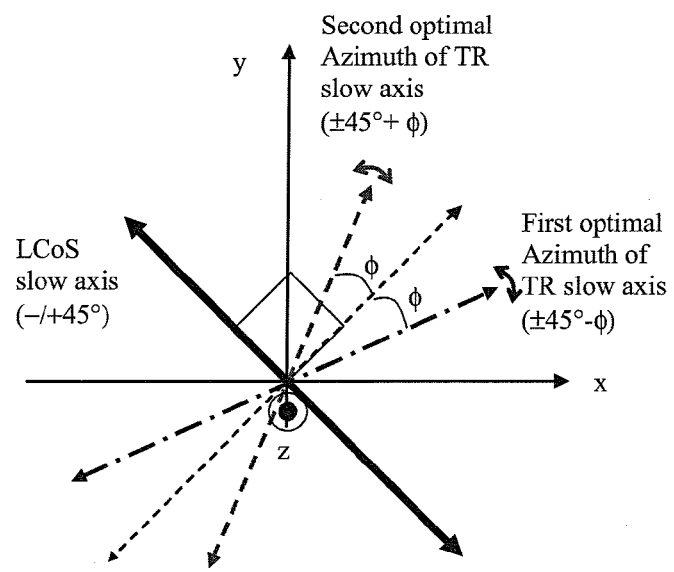
FIG. 3 is a schematic diagram showing the relative azimuthal orientations of the LCoS panel and the trim retarder slow axes.
Figure 5:
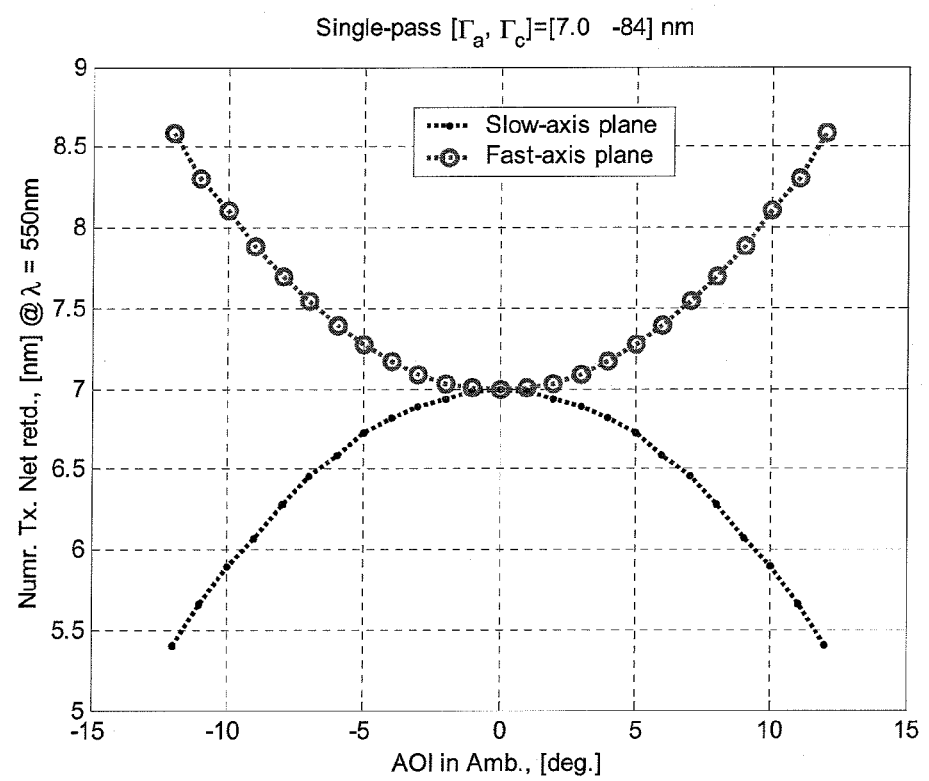
FIG. 5 illustrates modeled off-axis retardance profiles of a dual-layer A-plate/A-plate quartz retarder.
Figure 6:
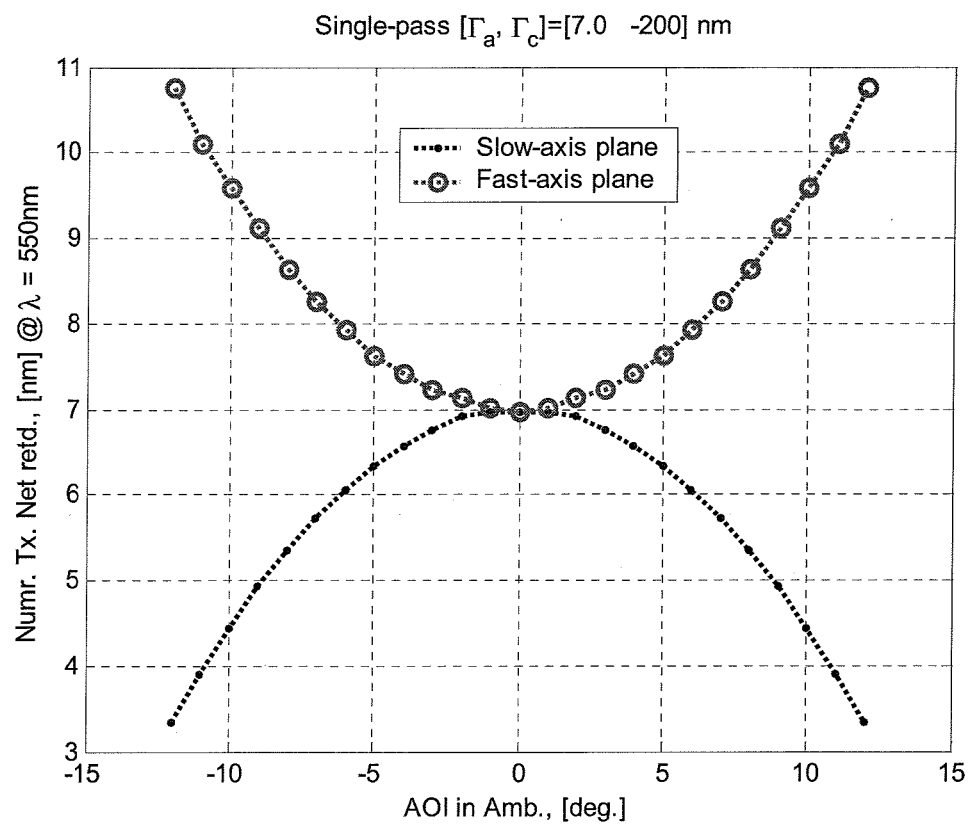
FIG. 6 illustrates modeled off-axis retardance profiles of a crossed-axes A-plate/A-plate quartz retarder.
Figure 7:
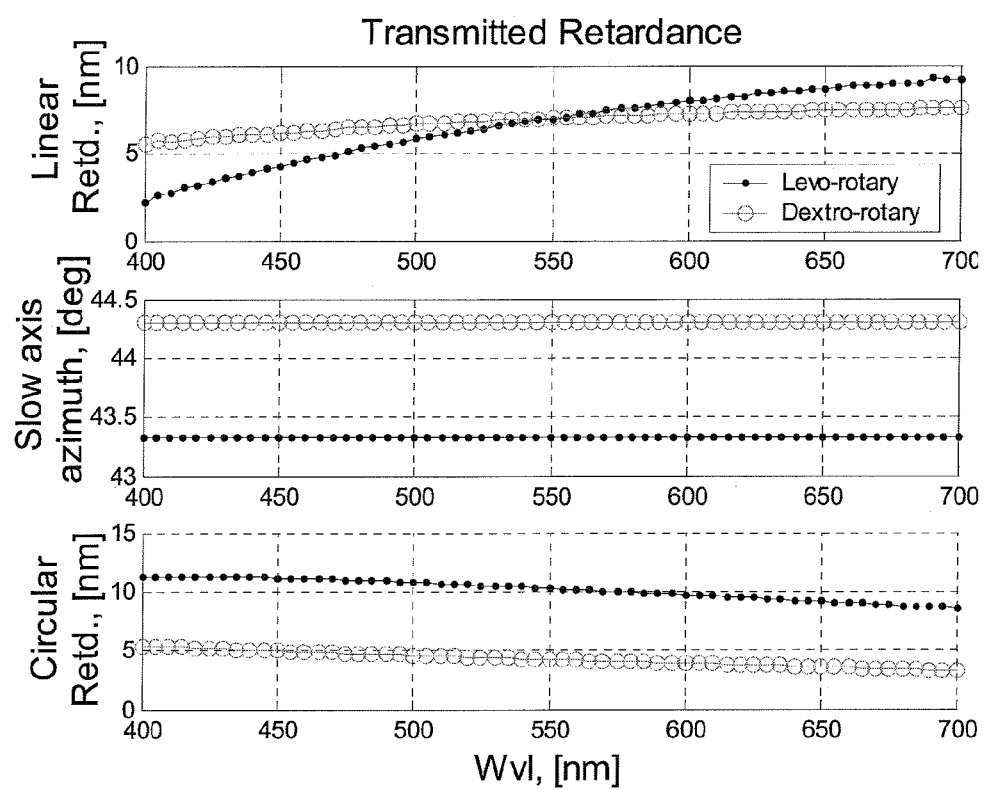
FIG. 7 illustrates modeled in-plane retardance components (linear and circular) and the retarder axis of a dual-layer A-plate retarder element.
Figure 8:
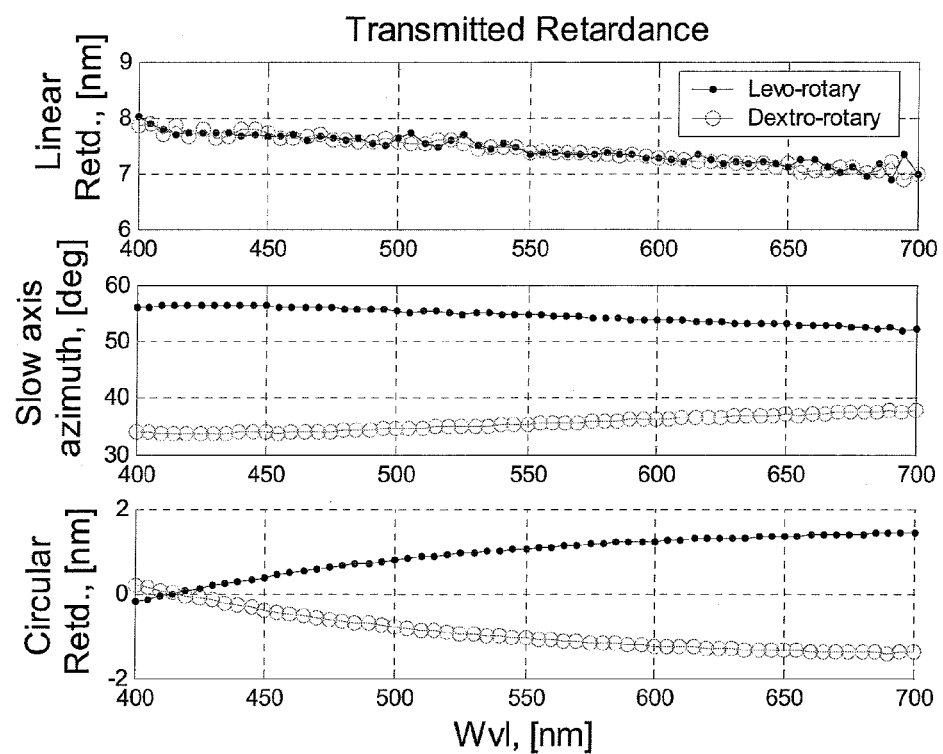
FIG. 8 illustrates modeled in-plane retardance components (linear and circular) and the retarder axis of a crossed-axes A-plate/A-plate quartz retarder.

The instant invention relates to a trim retarder including a single-layer birefringent crystal, which is cut such that its optic axis is at a high oblique angle (e.g., a high-tilt O-plate), and such that it has a low in-plane retardance value even when the birefringent crystal is relatively thick.

FIGS. 9a and 9b are schematic diagrams illustrating the decomposition of a high-tilt O-plate into its orthogonal components. In this example, the O-plate is a uniaxial birefringent layer that is parallel to the xy-plane. Referring to FIG. 9a, the optic axis (i.e., the extraordinary or C-axis) of the uniaxial birefringent layer is tilted with respect to the positive z-axis at an acute angle $\theta_c$, where $0 \leq \theta_c \leq 90°$; the projection of the C-axis onto the xy-plane is aligned at $\phi_c$ azimuthal angle with respect to the x-axis; Euler angles $(\theta_c, \phi_c)$ are defined according to a right-handed XYZ coordinate system (RH-XYZ). Using the quadratic index ellipsoid formula, the effective extraordinary refractive indices for rays normal and parallel to the device plane are expressed using:

$$\frac{1}{n_e^2(\text{in-plane})} = \frac{\sin^2(\theta_c)}{n_e^2} + \frac{\cos^2(\theta_c)}{n_o^2}, \text{ and} \quad (1)$$

$$\frac{1}{n_e^2(\text{out-of-plane})} = \frac{\sin^2(\theta_c)}{n_o^2} + \frac{\cos^2(\theta_c)}{n_e^2}, \quad (2)$$

where $n_e(\text{in-plane})$ and $n_e(\text{out-of-plane})$ refer to the extraordinary indices of refraction in the xy-plane and along the z-axis, respectively; $\theta_c$ is the C-axis tilt from the z-axis; $n_e$ and $n_o$ are the extraordinary and ordinary indices of refraction in the principal axes of the uniaxial medium, respectively. Referring to the FIG. 9b, the resolved in-plane and out-of-plane effective extraordinary refractive indices are illustrated. The ordinary index of refraction for both in-plane and out-of-plane birefringence is $n_o$; both are independent of $\theta_c$.

The effective birefringence for in-plane and out-of-plane retardance is expressed in terms of these effective extraordinary indices, $$\Delta n(\text{in-plane}) = n_e(\text{in-plane}) - n_o \quad (3)$$

and, $$\Delta n(\text{out-of-plane}) = n_e(\text{out-of-plane}) - n_o \quad (4)$$

The ratio of out-of-plane retardance to in-plane retardance of an O-plate layer is determined by taking the ratio of these effective birefringence values, $$\gamma = \frac{\Gamma_c(OP)}{\Gamma_a(OP)} = \frac{\Delta n(\text{out-of-plane})}{\Delta n(\text{in-plane})}, \quad (5)$$

where $\Gamma_c(OP)$ and $\Gamma_a(OP)$ are the approximate C-plate and A-plate retardances that can be obtained from an obliquely aligned layer, respectively.

Table 1 provides the theoretical results of A-plate, C-plate, and the ratio of C-plate to A-plate retardances for an out-of-plane tilt angle $\theta_t$ (i.e., 90°−$\theta_c$) between 80 and 87 degrees. In these calculations, a nominal 100 micron thick O-plate quartz layer, having indices of {1.5552, 1.5459} at λ=550 nm has been assumed. A ±5% thickness tolerance has been included (e.g., a physical thickness of 95 and 105 μm vs. 100 μm nominal).

TABLE 1

Estimated out-of-plane to in-plane retardance ratio of an obliquely aligned uniaxial birefringent layer.

| | $\theta_t$ (deg) | | | | | | | |
|---|---|---|---|---|---|---|---|---|
| | 80 | 81 | 82 | 83 | 84 | 85 | 86 | 87 |
| $\Gamma_a$(OP; 95 μm) | 25.9 | 21.0 | 16.6 | 12.7 | 9.4 | 6.5 | 4.2 | 2.4 |
| $\Gamma_a$(OP; 100 μm) | 27.2 | 22.1 | 17.5 | 13.4 | 9.9 | 6.9 | 4.4 | 2.5 |
| $\Gamma_a$(OP; 105 μm) | 28.6 | 23.2 | 18.4 | 14.1 | 10.4 | 7.2 | 4.6 | 2.6 |
| $\Gamma_c$(OP; 95 μm) | 839 | 844 | 849 | 853 | 856 | 859 | 862 | 863 |
| $\Gamma_c$(OP; 100 μm) | 884 | 889 | 894 | 898 | 901 | 904 | 907 | 909 |
| $\Gamma_c$(OP; 105 μm) | 928 | 933 | 938 | 943 | 946 | 950 | 952 | 954 |
| $\gamma(\Gamma_c/\Gamma_a)$ | 32.4 | 40.2 | 51.1 | 66.9 | 91.3 | 131.8 | 206.3 | 367.3 |

Figure 10:
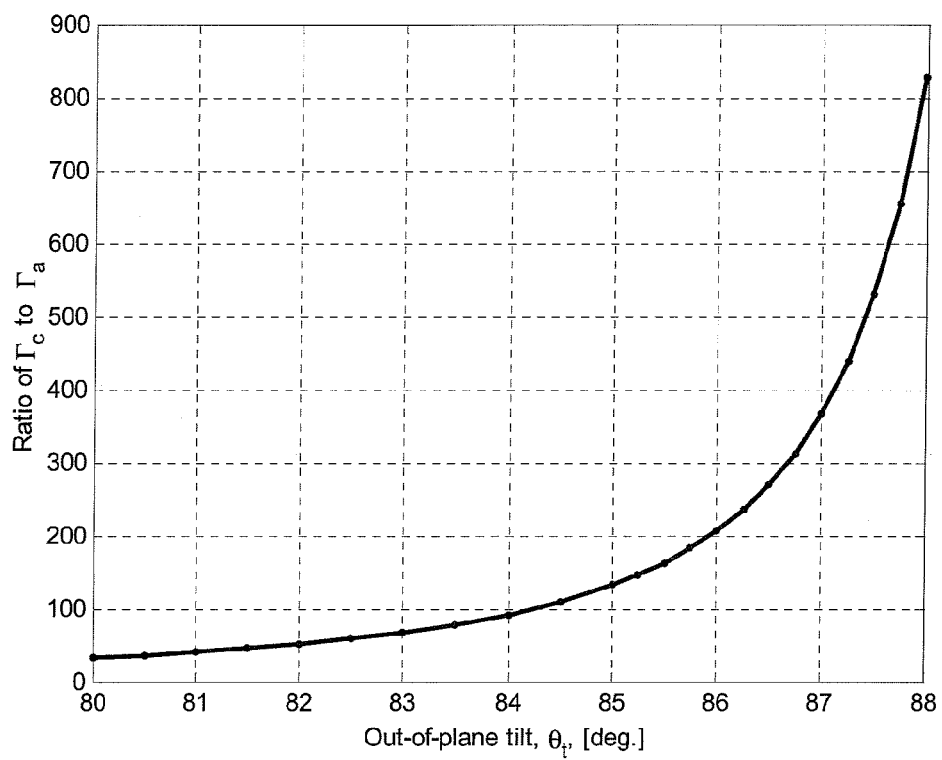
FIG. 10 shows the ratio of C-plate to A-plate retardance of an obliquely aligned uniaxial birefringent layer.

As illustrated in Table 1, the 100 micron thick quartz O-plate having an out-of-plane tilt angle $\theta_t$ between 80 and 87 degrees is expected to have an in-plane retardance of less than 30 nm and an out-of-plane retardance that is greater than 800 nm. The ratio of C-plate to A-plate retardance $\gamma(\Gamma_c/\Gamma_a)$, which is plotted against out-of-plane tilt angle $\theta_t$ in FIG. 10, increases rapidly for tilt angles greater than 85 degrees. In general, a γ ratio greater than 50 and less than about 150 provides a reasonable compromise between C an A plate retardances.

Referring again to Table 1, a single-layer quartz O-plate cut to 85 degree out-of-plane tilt and polished to a thickness of approximately 100 microns will yield nearly 7 nm of A-plate retardance at λ=550 nm, and approximately 900 nm of +C-plate retardance at λ=550 nm. As discussed above, this A-plate retardance value is quite suitable for compensating for residual birefringence in VAN-mode LCoS panels. Unfortunately, this parasitic +C-plate retardance is far from the −100 to −380 nm −C-plate retardance typically required for increasing the field of view in VAN-mode LCoS panels.

As discussed above, a 100 micron thick quartz O-plate having an out-of-plane tilt angle $\theta_t$ between 80 and 87 degrees will typically have a γ ratio greater than 50 and less than about 150. In other embodiments, for example wherein the tilt angle $\theta_t$ is outside this range (e.g., between 45 and 87 degrees or between 75 and 87 degrees), the ratio may vary. For example, in one embodiment the γ ratio is greater than about 10 and less than about 200. In another embodiment, the γ ratio is greater than about 30 and less than about 150.

In accordance with one embodiment of the instant invention, the high-tilt O-plate providing the low-magnitude A-plate retardance and the high magnitude +C plate retardance is coupled with a −C-plate component to provide a trim retarder having an overall A-plate/−C-plate retarder functionality suitable for VAN-mode LCoS panel contrast compensation.

Some examples of suitable −C-plate components utilize tight-pitch cholesteric liquid crystals, dielectric form birefringence, coplanar aligned polymer form birefringence, and/or inclined alignment of discotic compounds. Alternatively, the −C-plate component may be a birefringent crystal (e.g., quartz or magnesium fluoride) cut to form a layer having its optic axis perpendicular to the plane of the layer. Tight-pitch cholesteric liquid crystals (e.g., where the helical pitch LC medium is much shorter than the shortest wavelength in the visible wavelength range) are described, for example, in H. Hatoh, M. Ishikawa, Y. Hisatake and J. Hirata, T. Yamamoto, SID '92 Digest, p. 401, 1992, H. Seiberle, K. Schmitt and M. Schadt, 'Multidomain LCDs and complex optical retarder generated by photo-alignment," *Proceedings Euro Display '99*, pp. 121-125, 1999, and U.S. Pat. No. 6,829,026. Dielectric form birefringence is discussed, for example, in J. P. Eblen Jr., W. J. Gunning, J. Beedy, D. Taber, L. Hale, P. Yeh and M. Khoshnevisan, SID '94 Digest, p. 245, 1994 and in U.S. Pat. No. 5,196,953. Coplanar aligned polymer form birefringence is discussed, for example, in S-T. Wu, *J. Appl. Phys.*, 76(10), pp. 5975-5980, 1994. Inclined alignment of discotic compounds is discussed, for example, in H. Mori, Y. Itoh, Y. Nishiura, T. Nakamura and Y. Shinagawa, *Jap. J. Appl. Phys.*, 36, pp. 143-147, 1997.

Another example of −C-plate component that is suitable for coupling to the high-tilt O-plate is a form-birefringent (FB) dielectric stack integrated in an anti-reflection (AR) coating design (FBAR). As discussed in U.S. Pat. No. 7,170,574 and US Pat. Appl. No. US 20070070276, both of which are hereby incorporated by reference, these dielectric stacks are highly durable compared to their organic and/or polymeric counterparts and provide a low cost alternative to birefringent crystals.

Figure 11:
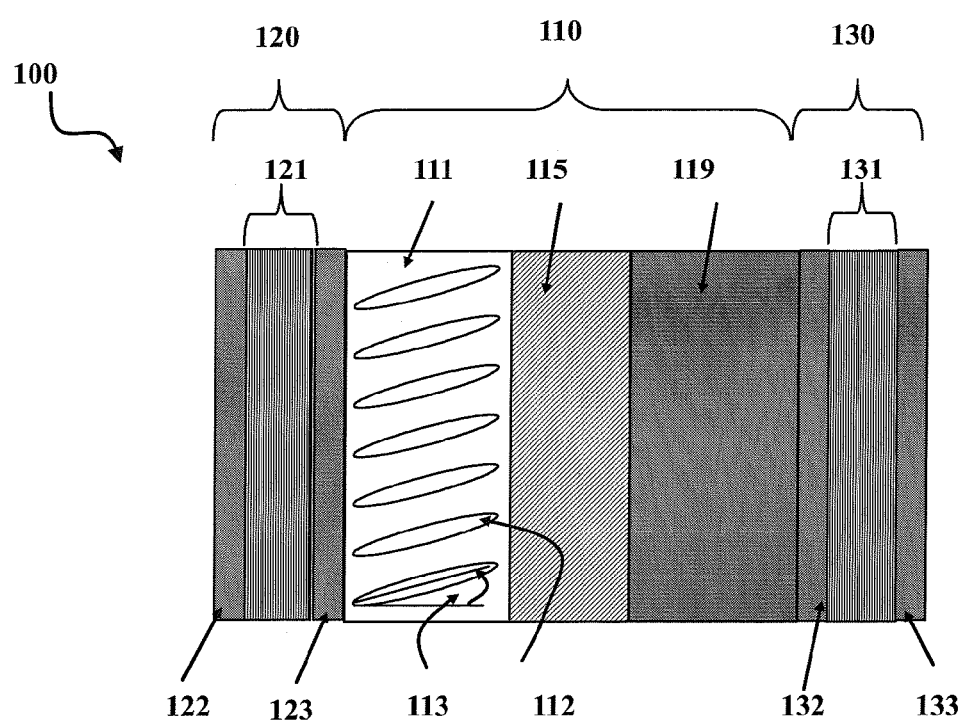
FIG. 11 shows a form-birefringent AR coated obliquely-aligned solid birefringent crystal plate in accordance with one embodiment of the instant invention.

Referring to FIG. 11, there is shown an embodiment in accordance with one embodiment of the instant invention, wherein a high-tilt O-plate is disposed between two FBAR coatings. More specifically, FIG. 11 illustrates a trim retarder 100 including a single-layer birefringent crystal assembly 110, a first FBAR dielectric coating 120 disposed on a first side of the single-layer birefringent crystal assembly, and a second FBAR dielectric coating 130 disposed on a second opposite side of the single-layer birefringent crystal assembly.

The single-layer birefringent crystal assembly 110 includes a single layer of birefringent crystal 111 having its refractive index ellipsoid 112 tilted at an acute angle 113 with respect to the device normal and laminated to a transparent substrate 119 with an adhesion layer 115. The single-layer birefringent crystal 111 is typically cut from a solid block of inorganic birefringent material such as quartz, magnesium fluoride, yttrium vandate, etc. In general, the birefringent crystal will be cut such that it forms a high-tilt O-plate (i.e., wherein the acute angle 113, which is equivalent to $\theta_c$, is less than 45°, and the tilt angle $\theta_t$, is greater than 45°). The range of suitable tilt angles $\theta_t$ is dependent upon the desired thickness of the birefringent layer and upon the birefringence of the birefringent material. For example, as discussed above, a 100 μm layer formed from a material having a low birefringence, such as quartz, will typically require a tilt angle $\theta_t$ between 80 and 85°, whereas a similarly sized layer formed from a material having a higher birefringence, such as yttrium vandate, may require a higher tilt angle $\theta_t$. Alternatively, if it is desired for the quartz layer to have a thickness greater than 100 μm, a higher tilt angle may be required. The thickness of the high-tilt O-plate will typically be determined in dependence of the birefringent material and the tilt angle $\theta_t$ to provide an A-plate retardance suitable for the intended application (e.g., for compensating for residual birefringence of a VAN-mode LCoS panel in the dark state). For example, with a quartz single-layer O-plate and a target 10 nm of in-plane retardance at wavelength of 550 nm, the tilt angle in general, will be between 71 and 88 degrees, and more likely between 81.5 and 85.5 degrees. The physical thickness of the high-tilt O-plate 111 will typically be between 10 μm and 1 mm, and more likely between 50 μm and 200 μm.

The first FBAR coating 120 includes a first form-birefringent stack 121 disposed between a first index-matching segment 122 and a second index-matching segment 123. Similarly, the second FBAR coating 130 includes a second form-birefringent stack 131 disposed between a third index-matching segment 132 and a fourth index-matching segment 133.

Each form-birefringent (FB) stack 121/131 is typically a periodic stack formed from alternating layers of contrasting refractive index materials. For example in one embodiment, each FB stack 121/131 includes alternating layers of high and low refractive index materials. In another embodiment, each FB stack 121/131 includes alternating layers of high, medium, and low refractive index materials. In each case, the thickness of each layer, which may vary for the different materials, is limited to a fraction of the operating wavelength (e.g. a fraction of λ=550 nm). As is known in the art, a periodic stack of alternating index layers having thicknesses much less than the wavelength of light can be designed to form a zeroth order sub-wavelength grating (ZOG) that functions as a −C-plate retarder. Since the −C-plate retardance of these diffractive elements arises from the structure (form) of the alternating layers rather than from molecular birefringence, the alternating layers may be formed from normally isotropic materials. For example, some examples of suitable materials for the alternating layers include organic and inorganic dielectrics such as silica ($SiO_2$, n=1.46), tantala ($Ta_2O_5$, n=2.20), alumina ($Al_2O_3$, n=1.63), hafnia ($HfO_2$, n=1.85), titania ($TiO_2$, n=2.37), niobia ($Nb_2O_5$, n=2.19), and magnesium fluoride ($MgF_2$, n=1.38).

The −C-plate retardance for each FB stack 121/131 is typically tailored to the specific application by varying the layer thicknesses, the refractive indices of the layers, and/or the number of alternating layers. For example, in one embodiment, the magnitude of the −C-plate retardance is estimated using zeroth order Effective Media Theory (EMT), wherein a periodic isotropic-index structure is described as a negative uniaxial birefringent layer having effective ordinary and extraordinary indices. EMT is discussed in further detail in U.S. Pat. No. 5,196,953, which is hereby incorporated by reference. Following the EMT C-plate retardance estimate, commercially available computer-modeling programs such as TFCalc and Optilayer can be used to design an FB stack by varying one or more of these parameters until the desired −C-plate retardance is obtained. In general, the −C-plate retardance should be sufficiently large to compensate for the +C-plate retardance provided by the high-tilt O-plate 111 and the +C-plate retardance provided by the VAN-mode LCoS panel. The −C-plate retardance of a FB stack is typically maximized by selecting the layer thicknesses of the alternating layers to be similar, by providing a large refractive index difference (e.g. greater than 0.5) between the alternating layers, and/or by increasing the number of alternating layers (e.g., which is typically between about 20 and 1000).

Each index-matching segment 122, 123, 132, 133 typically includes a plurality of quarter-wave stacks formed from materials having contrasting refractive index materials. Together with the FB stacks 121, 131, the index matching segments 122, 123, 132, 133 form the FBAR coatings 120, 130 used to reduce the reflection of light from the high-tilt O-plate 111 and/or from the supporting substrate 119. The index-matching segments 122, 123, 132, 133 may be formed from the same materials used to form the FB stacks 121/131, or from different materials. Notably, the index-matching segments 122, 123, 132, 133 provide additional out-of-plane retardance (e.g., typically functioning as +C-plates) that should also be factored in to the overall net retardance. In other words, in order to tune the net −C-plate retardance of the trim retarder 100 for the intended application (e.g., for increasing the field of view of a VAN-mode LCoS panel), the FB stacks 121, 131 should be designed to provide a −C-plate retardance that compensates for the +C-plate retardance provided by the index-matching segments 122, 123, 132, 133 in addition to compensating for the +C-plate retardance provided by the high-tilt O-plate 111, the VAN-mode LCoS panel, and/or other polarization sensitive devices in the MDPS.

In order to maintain a reasonable FB thickness, the ratio of C-plate to A-plate retardance $\gamma(\Gamma_c/\Gamma_a)$ in the high-tilt O-plate should be less than 500, and in general will be less than 150. For example, referring again to Table 1, a single-layer quartz O-plate cut to 85 degree out-of-plane tilt and polished to a thickness of approximately 100 microns, will yield nearly 7 nm of in-plane retardance at λ=550 nm, and a parasitic +C-plate retardance of approximately 900 nm at λ=550 nm. If the trim retarder 100 is designed to compensate for an LCoS imager panel that has a C-plate retardance of about 200 nm at λ=550 nm, the required C-plate compensation from the FBAR coatings is approximately −990 nm at λ=550 nm. This amount of −C-plate retardance is sufficient to negate the combined 1,100 nm quartz O-plate and VAN panel +C-plate retardance. In this calculation, the base indices for the C-plate retardance have been pegged to $\{n_e, n_o\}$ of $\{1.65, 1.50\}$ for +C-plate and $\{1.50, 1.65\}$ for −C-plate, at λ=550 nm, as outlined in U.S. Pat. No. 7,170,574. In one embodiment, the C-plate retardance of about −990 at λ=550 nm is provided by two FB stacks, wherein each stack is formed from 194 alternating layers of silica and tantala materials, such that the total thickness of each FBAR coating is about 6.2 μm.

While the FB stacks 121, 131 and the index-matching segments 122, 123, 132, 133 have been described above as separate components, in practice the FB stacks 121,131 are usually integrated in the anti-reflection (AR) coating design such that the transition between each FB stack 121, 131 and the corresponding index-matching segments 122, 123, 132, 133 is indistinct. The first 120 and second 130 FBAR coatings are typically fabricated using conventional vacuum deposition techniques such as chemical vapour deposition (CVD), plasma enhanced CVD, electron beam evaporation, thermal evaporation, sputtering, and/or atomic layer deposition.

In the above-described embodiment, a solid birefringent crystal, cut to an oblique angle alignment and sandwiched between two form birefringent AR stacks, is used to provide a trim retarder having A/−C-plate retarder functionality that is suitable for LCoS panel contrast compensation.

Advantageously, the A-plate retardance of this trim retarder 100 is provided by the single-layer birefringent crystal (e.g., cut as a high-tilt O-plate). Since the A-plate retardance is provided by an inorganic birefringent layer rather than an organic layer, the trim retarder 100 is relatively durable and reliable. For example, the trim retarder 100 should be able to withstand high light flux densities (e.g., above 40 Mlux) and high temperatures (e.g., above 120 degrees Celsius) for extended periods of time (e.g., over 10,000 hours). Since the A-plate retardance is provided by a high-tilt O-plate rather than an A-plate or a low-tilt O-plate, the trim retarder 100 has a relatively tolerant in-plane retarder thickness. For example, with a nominal 100 μm thick quartz plate, a 1% thickness tolerance translates into a 1 μm polishing error requirement. Since the A-plate retardance is provided by a high-tilt O-plate rather than an A-plate or low-tilt O-plate, the relatively thick in-plane retarder plate can be cut to provide true zeroth order small magnitude retardance rather than multiple-wave retardation. Accordingly, the trim retarder 100 is suitable for relatively broadband applications. Since the A-plate retardance is provided by a single layer of birefringent crystal rather than a cascade of two birefringent layers, the problems associated with tight azimuthal angle tolerances are obviated. In addition, the problems associated with circular retardance are reduced. In particular, it is known in the art that non-optically active single-layer crystal O-plates should not generate circular retardance. In addition, since the A-plate retardance is provided by a single layer of birefringent crystal rather than a cascade of two birefringent layers, the trim retarder has a relatively stable effective fast/slow axis at all wavelengths, allows for relatively insensitive azimuthal over-clocking, and provides relatively good retardance magnitude and orientation uniformity (i.e., the compound errors associated with a cascade of two-layers are eliminated).

Further advantageously, the −C-plate retardance of the trim retarder 100 is provided by one or more FBAR coatings. Since the FBAR coating(s) are able to provide sufficient −C-plate to cancel out the +C-retardance of the high-tilt O-plate and compensate for the +C-plate retardance of an LCD panel (e.g., a VAN-mode LCoS), a trim retarder having fall-function A/−C-plate functionality is provided. The FBAR coating(s) are deposited directly onto the external surfaces of the high-tilt O-plate and/or the supporting substrate. Hence, the full-function trim retarder is practical to fabricate and has potentially high manufacturing yields. Moreover, the deposited FBAR dielectric film conforms to the surface of the high-tilt O-plate and/or the supporting substrate. As such, the C-plate axis of the −C-plate retarder fabricated as a thin-film stack is automatically aligned normal to the surface. In addition, when the FBAR is fabricated from inorganic dielectric layers, the durability of the crystal plate trim retarder having A/−C-plate retarder functionality is not compromised. Notably, FBAR coatings have a relatively broadband −C-plate retardance.

Figure 12:
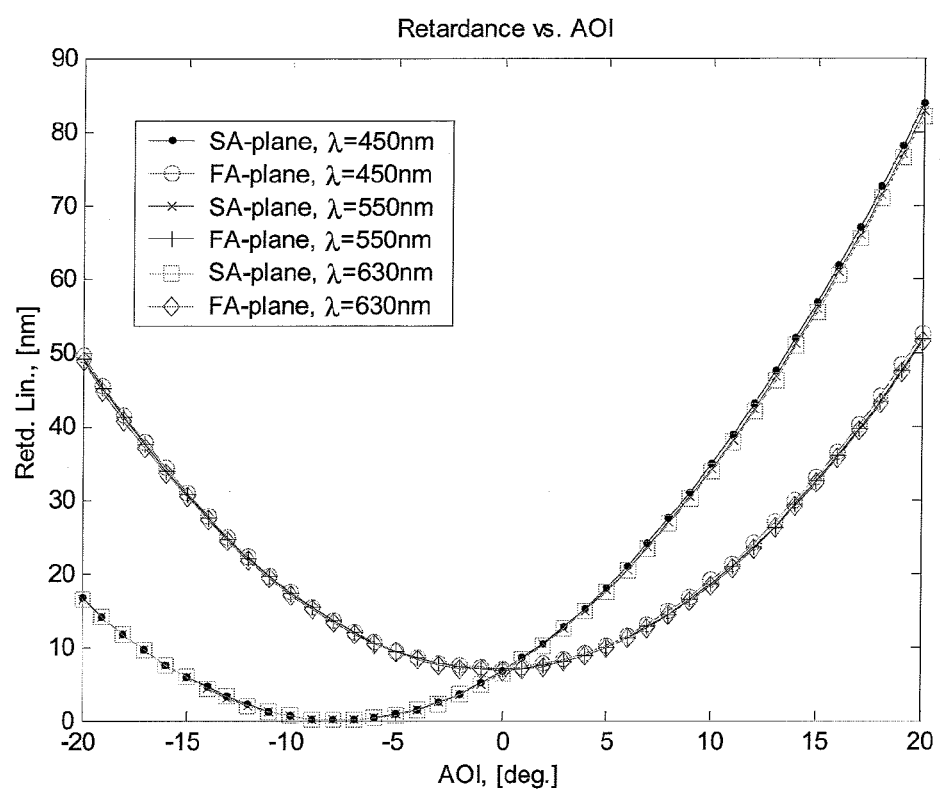
FIG. 12 illustrates measured off-axis retardance profiles of an uncoated single-layer O-plate quartz retarder at red, green and blue wavelengths.

In order to illustrate the contrast compensation efficacy of the full function trim retarder 100 illustrated in FIG. 11, the retardance of it and some of its individual components have been examined in further detail. Referring to FIG. 12, the measured retardance vs. AOI profile along the slow-axis (SA) and fast-axis (FA) plane of an uncoated single-layer quartz O-plate is shown. The uncoated single-layer quartz O-plate is about 100 µm thick and has a tilt angle of about 85 degrees. It is clear that there is little dispersion between the angular profiles at the red (630 nm), green (550 nm) and blue (450 nm) wavelengths. The linear retardance profile is symmetric about 0 degrees AOI along the FA-plane, while the profile along the SA is asymmetric.

Figure 13:
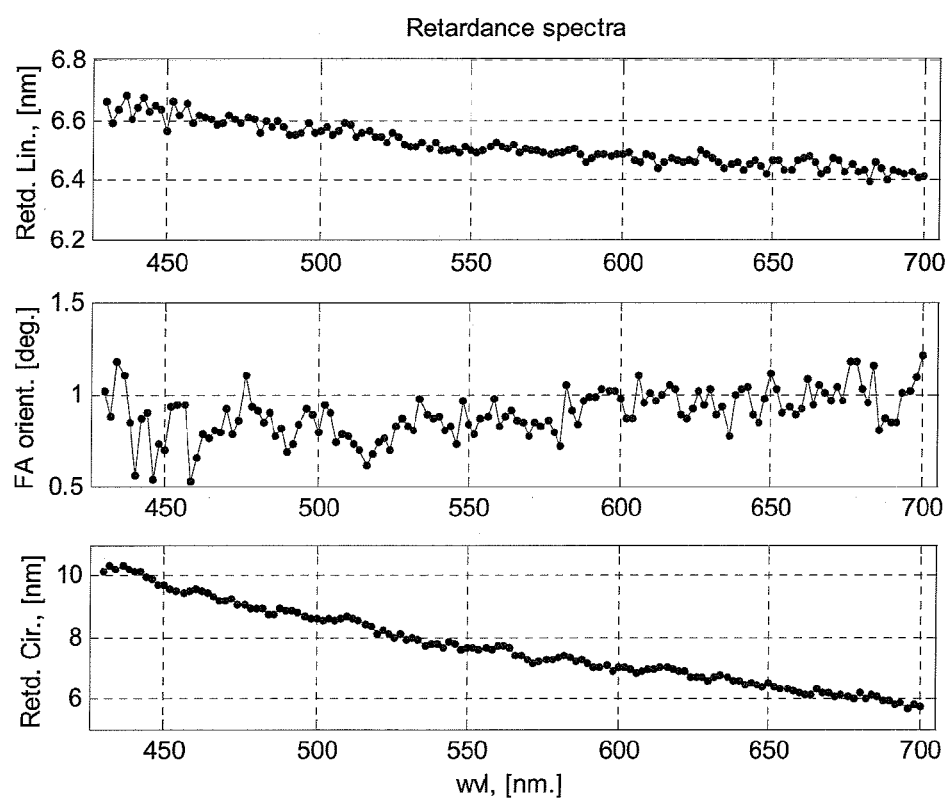
FIG. 13 illustrates measured in-plane retardance spectra (linear and circular) and the retarder axis of an uncoated single-layer O-plate quartz retarder.

FIG. 13 shows the measured in-plane linear retardance spectrum, circular retardance spectrum, and axis orientation spectrum for the uncoated single-layer quartz O-plate, laminated onto a glass substrate. This retarder gives about 6.5 nm linear retardance and 7.5 nm circular retardance at λ=550 nm. The linear retardance is relatively non-dispersive. The circular retardance magnitude is both significant and dispersive. The axis orientation shows a relatively flat profile across the wavelength range, although the data may be influenced by the lack of an AR coating.

Figure 14:
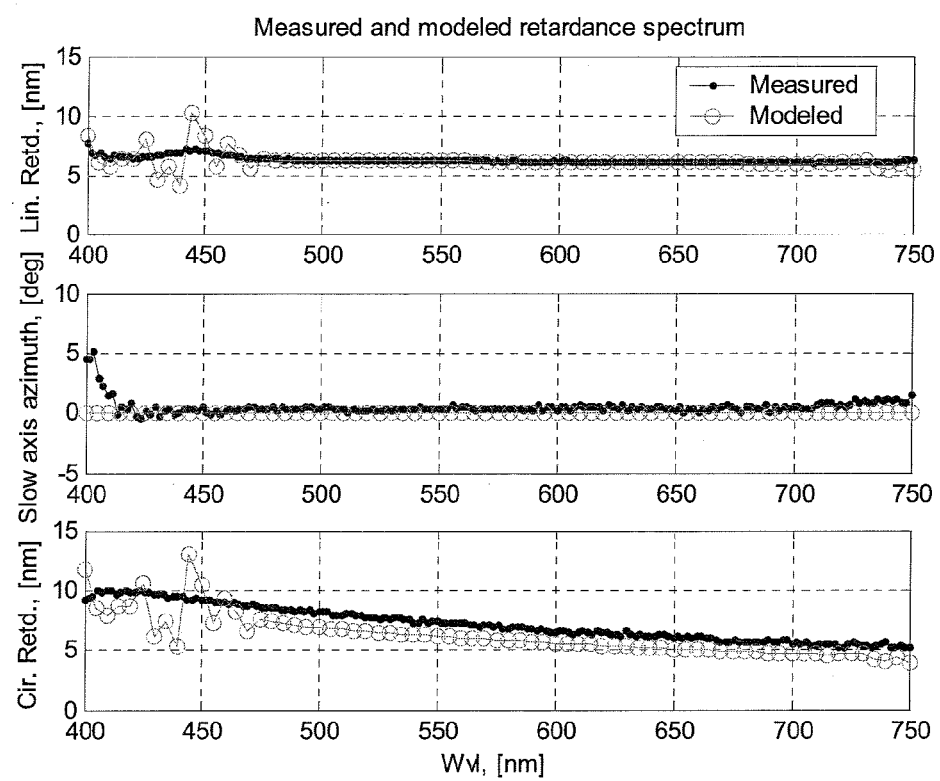
FIG. 14 illustrates measured and modeled in-plane retardance spectra (linear and circular) and the retarder axis of a green-red FBAR coated single-layer quartz O-plate retarder.

Referring to FIG. 14, the measured and modeled linear retardance spectra, the circular retardance spectrum, and the axis orientation spectrum for the FBAR coated single-layer quartz O-plate retarder is shown. The FBAR coatings (e.g., on either side of the laminated O-plate) include dual-band (i.e., red and green) AR stacks in addition to the −C-plate FB stacks. The numerical model representing the high tilt single-layer quartz O-plate included an 85 degree tilt angle and an 85 µm plate thickness. Full $\{n_e, n_o\}$ dispersion data was used, which had indices of 1.5554 and 1.5461, for extraordinary and ordinary waves, respectively (i.e., which is available from http://www.almazoptics.com/Quartz.htm). Both the measured and modeled in-plane retardance was about 6 nm over the entire AR band. Notably, this A-plate retardance is suitable for compensating for the residual A-plate retardance in an LCoS imager panel.

Figure 15:
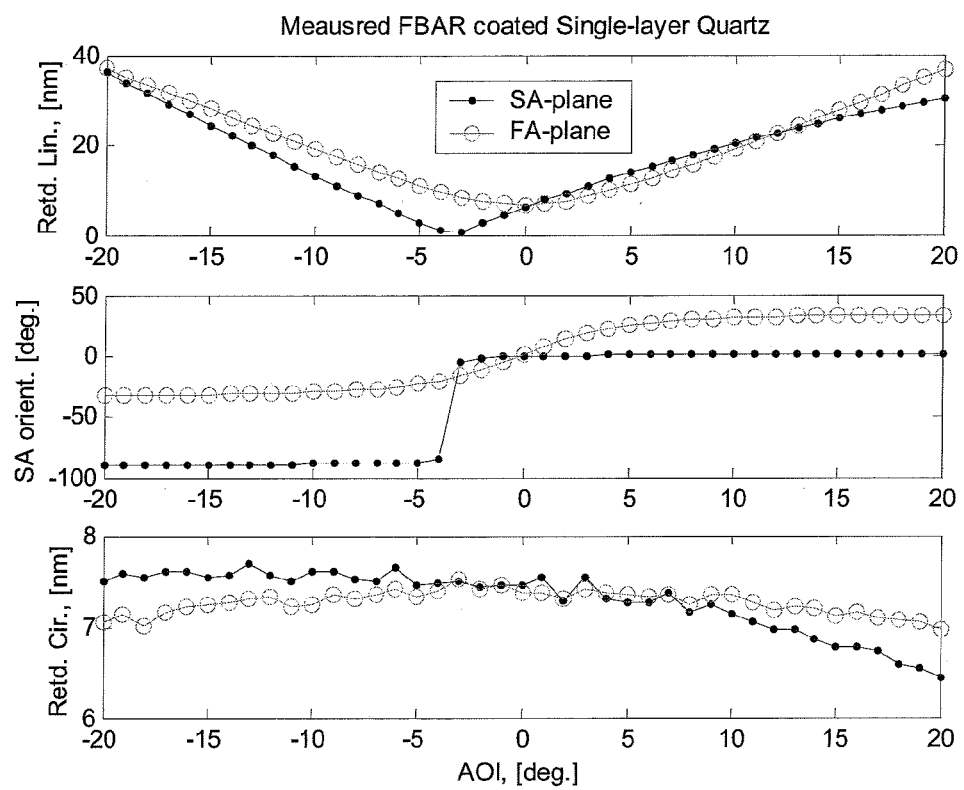
FIG. 15 illustrates measured retardation triplet (linear, axis and circular retardance) of a coated single-layer quartz O-plate.

The −C-plate functionality of the FBAR coated single-layer quartz O-plate retarder is evident from the measured retardance versus AOI profiles, which are illustrated in FIG. 15. The added FBAR stacks provided for about −990 nm of C-plate retardance, which when combined with the approximately +900 nm C-plate retardance of the single-layer quartz O-plate, yielded a net C-plate retardance of approximately −180 nm. The approximately −180 nm net C-plate retardance is suitable for compensating for an approximately 200 nm C-plate retardance of an LCoS imager panel. Notably, the positive and negative C-plate retardances from the various elements do not simply add due to the refractive index differences.

Figure 16:
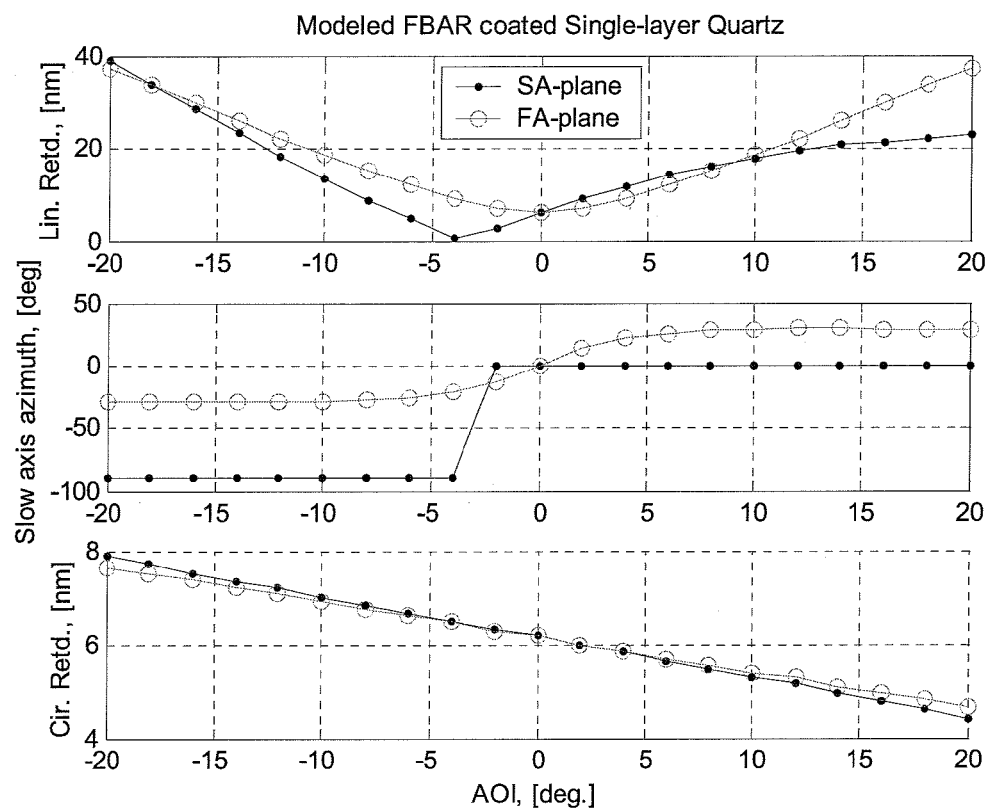
FIG. 16 illustrates modeled retardation triplet (linear, axis and circular retardance) of a coated single-layer quartz O-plate.

The FBAR coated single-layer quartz O-plate retarder has been also modeled to yield the retardation triplet (e.g., linear and circular retardance as well as axis orientation) as shown in FIG. 16. Isotropic gyration has been assumed, which is the cause of the discrepancies between the measured and modeled circular retardance profiles versus AOI.

Figure 17:
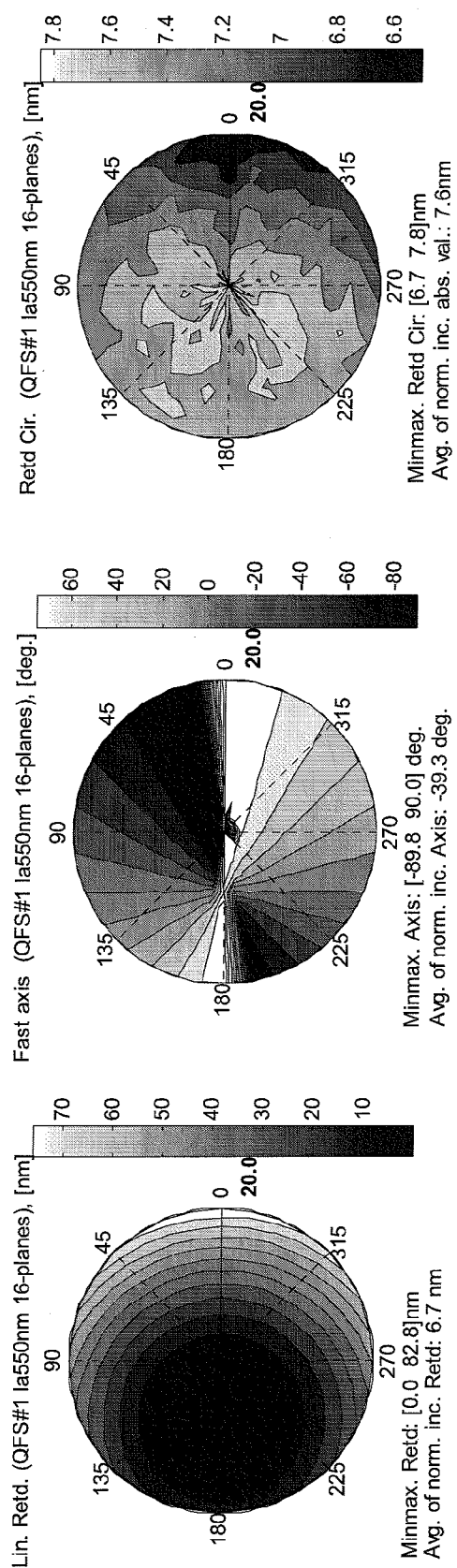
FIG. 17 illustrates measured retardation triplet (linear, axis and circular retardance) of a coated single-layer quartz O-plate over all azimuthal planes at 0 to 20 degrees AOI.

For completeness, the full field-of-view (FOV) plots of the retardation triplet, measured using the coated single-layer quartz O-plate are given in FIG. 17. It can be seen that the use of a highly tilted single-layer quartz O-plate resulted in a significant asymmetry in the linear retardance and axis orientation FOV profiles. Fortunately, in a double-pass scheme, such as a trim retarder used as a compensator in a reflective LCoS light engine, the asymmetry is cancelled out in double-pass transmission. The circular retardance FOV profile suggests that a gyration constant of the quartz layer is close to isotropic in nature.

The coated single-layer quartz O-plate (e.g., FBAR on either side of the laminated O-plate) has been tested as a contrast enhancer for a VAN-mode LCoS system. The test set up is as described in K. Tan et al., "Design and characterization of a compensator for high contrast LCoS projection systems," SID 2005, p. 1810, 2005, which is hereby incorporated by reference. The contrast ratios at green and red wavelength bands were measured to be approximately 3,500:1 and 4,500:1. These results can be compared to the LCP/FBAR retarder, described in K. Tan et al., "Design and characterization of a compensator for high contrast LCoS projection systems," SID 2005, p. 1810, 2005, where the green and red band contrast ratios were 6,500:1 and 8,500:1, utilizing the same test set-up and the same LCoS panel.

The relatively poorer contrast ratios are attributed to the presence of non-negligible circular retardance in the thick single-layer quartz O-plate. It is anticipated that if the thickness of the single-layer quartz O-plate is decreased by a factor of 4 (e.g., approximately 22 µm, instead of 88 µm thick), the circular retardance will also be decreased by a factor of 4, and hence the contrast ratio will increase. Even when the thickness of the single-layer quartz O-plate is decreased by a factor of 4 (e.g., is approximately 22µ thick), the 6.5 nm in-plane retarder is still thicker than a quartz quarter-waveplate (e.g., which would have a thickness of approximately 14 µm). As discussed above, an important advantage of using a using a 6.5 nm retarder configured as a quartz O-plate rather than a 138 nm retarder configured as a quartz A-plate is the associated retarder over-clocking sensitivity. In general, there is a 10:1 factor between the sensitivity of the quarter-waveplate versus a small magnitude retarder.

Alternatively, the relatively poor contrast may be increased by selecting a different birefringent crystal material, where the birefringence is low (e.g., like quartz) but without the optical activity (i.e., manifests as circular retardance). For example, one example of a suitable material is single crystal $MgF_2$.

Of course, the above embodiments have been provided as examples only. It will be appreciated by those of ordinary skill in the art that various modifications, alternate configurations, and/or equivalents will be employed without departing from the spirit and scope of the invention. For example, while positioning the high-tilt O-plate between two FBAR coatings provides a low-stress design, in other embodiments only one side of a high-tilt O-plate is coated with an FBAR. Alternatively, in other embodiments, one or more FBAR coatings and a high-tilt O-plate are supported by different substrates. In addition, while the FBAR coated high-tilt O-plates have been stated as being suitable for use as trim retarders in VAN-mode LCoS systems, in other embodiments they are used in other LCoS systems and/or in transmissive LCD projections systems. Furthermore, while the FBAR coated high-tilt O-plates have been shown as stand-alone trim retarders, in other embodiments they are integrated into the display panel cover of a microdisplay projection system. Accordingly, the scope of the invention is therefore intended to be limited solely by the scope of the appended claims.

The invention claimed is:

1. An optical retarder comprising:
    a single-layer zero-order retarder including a uniaxial birefringent crystal layer having its optic axis at an oblique angle to a surface of the uniaxial birefringent crystal layer, the oblique angle selected such that the uniaxial birefringent crystal layer has an in-plane retardance in a predetermined wavelength range suitable for compensating for residual in-plane retardance of a liquid crystal display panel used in the predetermined wavelength range, a thickness of the uniaxial birefringent crystal layer greater than 10 µm; and
    at least one multi-layer stack including at least one periodic stack of alternating layers of contrasting refractive index materials, a thickness and refractive index of each of the alternating layers selected such that the at least one multi-layer stack has a negative out-of-plane retardance in the predetermined wavelength range that is suitable for compensating for positive out-of-plane retardance of the uniaxial birefringent crystal layer and positive out-of-plane retardance of the liquid crystal display panel, in the predetermined wavelength range.

2. An optical retarder according to claim 1, wherein the at least one multi-layer stack includes a first anti-reflection coating, and wherein the at least one periodic stack of alternating layers includes a first form-birefringent stack integrated into the first anti-reflection coating.

3. An optical retarder according to claim 2, wherein the at least one multi-layer stack includes a second anti-reflection coating, and wherein the at least one periodic stack of alternating layers includes a second form-birefringent stack integrated into the second anti-reflection coating.

4. An optical retarder according to claim 3, wherein the first anti-reflection is supported by a first side of the uniaxial birefringent crystal layer and the second anti-reflection coating is supported by a second opposite side of the uniaxial birefringent crystal layer.

5. An optical retarder according to claim 4, comprising a substrate for supporting the uniaxial birefringent crystal layer, the substrate having a first surface laminated to the uniaxial birefringent crystal layer and a second surface on which one of the first and second anti-reflection coatings is deposited.

6. An optical retarder according to claim 1, wherein the in-plane retardance of the uniaxial birefringent crystal layer is less than 30 nm.

7. An optical retarder according to claim 1, wherein the thickness of the uniaxial birefringent crystal layer is greater than 50 µm.

8. An optical retarder according to claim 1, wherein the oblique angle is greater than 45°.

9. An optical retarder according to claim 1, wherein the oblique angle is greater than 75°.

10. An optical retarder according to claim 1, wherein the oblique angle is between 80° and 86°.

11. An optical retarder according to claim 1, wherein the predetermined wavelength range is from 380 nm to 800 nm.

12. An optical retarder comprising:
    a uniaxial birefringent crystal layer having its optic axis at an oblique angle to a surface of the uniaxial birefringent crystal layer, the oblique angle selected such that the uniaxial birefringent crystal layer has an in-plane retardance in a predetermined wavelength range suitable for compensating for residual in-plane retardance of a liquid crystal display panel used in the predetermined wavelength range, a thickness of the uniaxial birefringent crystal layer greater than 10 µm; and
    at least one multi-layer stack including at least one periodic stack of alternating layers of contrasting refractive index materials, a thickness and refractive index of each of the alternating layers selected such that the at least one multi-layer stack has a negative out-of-plane retardance in the predetermined wavelength range that is suitable for compensating for positive out-of-plane retardance of the uniaxial birefringent crystal layer and positive out-of-plane retardance of the liquid crystal display panel, in the predetermined wavelength range,
    wherein the oblique angle is selected such that a ratio of the positive out-of-plane retardance of the uniaxial birefringent crystal layer to the in-plane retardance of the uniaxial birefringent crystal layer is greater than about 10 and less than about 200.

13. An optical retarder comprising:
    a uniaxial birefringent crystal layer having its optic axis at an oblique angle to a surface of the uniaxial birefringent crystal layer, the oblique angle selected such that the uniaxial birefringent crystal layer has an in-plane retardance in a predetermined wavelength range suitable for compensating for residual in-plane retardance of a liquid crystal display panel used in the predetermined wavelength range, a thickness of the uniaxial birefringent crystal layer greater than 10 µm; and
    at least one multi-layer stack including at least one periodic stack of alternating layers of contrasting refractive index materials, a thickness and refractive index of each of the alternating layers selected such that the at least one multi-layer stack has a negative out-of-plane retardance in the predetermined wavelength range that is suitable for compensating for positive out-of-plane retardance of the uniaxial birefringent crystal layer and positive outof-plane retardance of the liquid crystal display panel, in the predetermined wavelength range,
wherein the oblique angle is selected such that a ratio of the positive out-of-plane retardance of the uniaxial birefringent crystal layer to the in-plane retardance of the uniaxial birefringent crystal layer is greater than about 30 and less than about 150.

14. An optical retarder according to claim 13, wherein the uniaxial birefringent crystal layer comprises quartz.

15. A liquid crystal display based projection system comprising:
- a light source;
- a liquid crystal display panel;
- at least one polarizer for receiving light from the light source and transmitting a first linearly polarized light having a first linear polarization axis to the liquid crystal display panel, the liquid crystal display panel for optically modulating the first linearly polarized light, the at least one polarizer for receiving the optically modulated light and for transmitting a second linearly polarized light having a second linear polarization axis;
- a projection lens for projecting the second linearly polarized light onto a screen; and
- a trim retarder disposed between the liquid crystal display panel and at the least one polarizer, the trim retarder including:
    - a single-layer zero-order retarder including a uniaxial birefringent crystal layer having its optic axis at an oblique angle to a surface of the uniaxial birefringent crystal layer, the oblique angle selected such that the uniaxial birefringent crystal layer has an in-plane retardance suitable for compensating for residual in-plane retardance of the liquid crystal display panel, a thickness of the uniaxial birefringent crystal layer greater than 10 μm; and
    - at least one multi-layer stack including at least one periodic stack of alternating layers of contrasting refractive index materials, a thickness and refractive index of each of the alternating layers selected such that the at least one multi-layer stack has a negative out-of-plane retardance that is suitable for compensating for positive out-of-plane retardance of the uniaxial birefringent crystal layer and positive out-of-plane retardance of the liquid crystal display panel.

16. The liquid crystal display based projection system according to claim 15, wherein the liquid crystal display panel is a reflective liquid crystal display panel, the first and second linear polarization axes are orthogonal, and the at least one polarizer is a polarizing beamsplitter.

17. The liquid crystal display based projection system according to claim 16, wherein the liquid-crystal display panel comprises a vertically-aligned nematic liquid crystal on silicon panel.

* * * * *